US009207926B2

(12) United States Patent
Maul

(10) Patent No.: US 9,207,926 B2
(45) Date of Patent: *Dec. 8, 2015

(54) DYNAMIC IMAGE COMPOSITION SYSTEM EMPLOYING FENCED APPLICATIONS

(71) Applicant: International Business Machines Corporation, Armonk, NY (US)

(72) Inventor: Christopher A Maul, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 124 days.

This patent is subject to a terminal disclaimer.

(21) Appl. No.: 13/909,080

(22) Filed: Jun. 4, 2013

(65) Prior Publication Data

US 2014/0359597 A1    Dec. 4, 2014

(51) Int. Cl.

| | |
|---|---|
| G06F 19/00 | (2011.01) |
| G06F 15/177 | (2006.01) |
| G06F 15/173 | (2006.01) |
| G06F 13/00 | (2006.01) |
| G06F 13/28 | (2006.01) |
| G06F 9/44 | (2006.01) |
| G06F 9/45 | (2006.01) |
| G06F 9/445 | (2006.01) |
| G06F 9/46 | (2006.01) |

(52) U.S. Cl.
CPC ........................................ *G06F 8/63* (2013.01)

(58) Field of Classification Search
CPC ... G06F 8/63; G06F 11/1453; G06F 11/1464; G06F 11/1469; G06F 17/30578; G06F 21/575; G06F 13/102; G06F 13/4022; G06F 9/4411; G06F 9/441; G06F 9/44505; G06F 9/45533; G06F 9/4445; G06F 8/65
See application file for complete search history.

(56) References Cited

U.S. PATENT DOCUMENTS

| | | | |
|---|---|---|---|
| 7,233,940 B2 * | 6/2007 | Bamberger et al. | 707/999.003 |
| 7,359,762 B2 * | 4/2008 | Etter et al. | 700/180 |
| 2005/0138084 A1 * | 6/2005 | Azagury et al. | 707/200 |
| 2007/0079309 A1 * | 4/2007 | Schmidt et al. | 718/100 |
| 2007/0162899 A1 * | 7/2007 | Schmidt et al. | 717/136 |
| 2007/0294676 A1 * | 12/2007 | Mellor et al. | 717/139 |
| 2008/0109542 A1 * | 5/2008 | Ferri et al. | 709/222 |
| 2008/0196024 A1 * | 8/2008 | Barfield et al. | 717/177 |
| 2009/0222461 A1 | 9/2009 | Alpern | |
| 2009/0300578 A1 * | 12/2009 | Neil | 717/104 |
| 2010/0306337 A1 | 12/2010 | Dehaan | |
| 2010/0306772 A1 | 12/2010 | Arnold | |

(Continued)

OTHER PUBLICATIONS

GARIMELLA1—"Understanding and exploiting snapshot technology for data protection, Part 1: Snapshot technology overview"; DeveloperWorks, Apr. 26, 2006, pp. 1-7.

(Continued)

*Primary Examiner* — Don Wong
*Assistant Examiner* — Anibal Rivera
(74) *Attorney, Agent, or Firm* — Parashos Kalaitzis; Mark P Kahler

(57) ABSTRACT

The disclosed dynamic image composition system employing fenced applications includes an information handling system (IHS) that may employ an application fencing tool to generate a fenced application. The IHS may also employ a fenced imaging tool to dynamically modify images with fenced applications, statically modify images with fenced applications and/or generate images with fenced applications.

6 Claims, 10 Drawing Sheets

(56) References Cited

U.S. PATENT DOCUMENTS

| | | |
|---|---|---|
| 2011/0061046 A1 | 3/2011 | Phillips |
| 2011/0093847 A1 | 4/2011 | Shah |
| 2011/0154331 A1 | 6/2011 | Ciano |
| 2011/0265082 A1 | 10/2011 | Ashok |
| 2011/0265087 A1* | 10/2011 | Chen et al. .................... 718/102 |
| 2011/0307531 A1 | 12/2011 | Gaponenko |
| 2012/0030439 A1* | 2/2012 | Engelsiepen et al. ......... 711/162 |
| 2012/0131480 A1 | 5/2012 | Kalmbach |
| 2013/0111457 A1* | 5/2013 | Culter ........................... 717/171 |
| 2013/0275596 A1* | 10/2013 | Subramaniam ............... 709/226 |

OTHER PUBLICATIONS

GARIMELLA2—"Understanding and exploiting snapshot technology for data protection, Part 1: Snapshot technology overview"; downloaded from http://www.ibm.com/developerworks/tivoli/library/t-snaptsm1/index.html on Mar. 12, 2013, pp. 1-10.

DTMF—"Open Virtualization Format White Paper", Version 1.0.0, Distributed Management Task Force, Inc., Feb. 6, 2009, pp. 1-39.

* cited by examiner

DYNAMIC IMAGE COMPOSITION SYSTEM EMPLOYING FENCED APPLICATIONS

BACKGROUND

The disclosures herein relate generally to information handling systems (IHSs), and more specifically, to IHSs that manage images of particular IHSs. An image, i.e. a system image, may be a copy of the entire state of an IHS stored as a file. Images of particular IHSs may need to be modified over time or generated anew.

BRIEF SUMMARY

In one embodiment, a method of managing images is disclosed. The method includes installing an operating system in an information handling system (IHS). The method also includes generating a first partition in the IHS. The method further includes installing an application to the first partition in the IHS to provide an installed application, wherein installing the application generates dependencies. The method still further includes generating, by an application fencing tool in the IHS, a dependency script on the first partition that replicates dependencies made during the installing of the application. The method also includes cloning, by the dependency script, the dependencies to the first partition. The method further includes generating, by the application fencing tool in the IHS, a fenced application in the first partition. The method still further includes modifying an image in the IHS, by a fenced imaging tool, to provide a first modified image, wherein the modifying includes unpacking the fenced application to provide the first modified image.

In another embodiment, an information handling system (IHS) is disclosed. The IHS includes a processor and a system memory coupled to the processor. The system memory includes an application fencing tool, wherein the application fencing tool configures the IHS to install an operating system in the IHS. The application fencing tool also configures the IHS to generate a first partition in the IHS. The application fencing tool further configures the IHS to install an application to the first partition in the IHS to provide an installed application thus generating dependencies. The application fencing tool still further configures the IHS to generate a dependency script on the first partition that replicates dependencies made during the install of the application. The application fencing tool also configures the IHS to clone by the dependency script the dependencies to the first partition. The application fencing tool also configures the IHS to generate a fenced application in the first partition. The system memory of the IHS further includes a fenced imaging tool that configures the IHS to modify an image in the IHS, to provide a first modified image, by unpacking the fenced application to provide the first modified image.

In one embodiment, a computer program product is disclosed that includes a non-transitory computer readable storage medium. The computer program product includes first instructions that install an operating system in an IHS. The computer program product also includes second instructions that generate a first partition in the IHS. The computer program product further includes third instructions that install an application to the first partition in the IHS to provide an installed application thus generating dependencies. The computer program product still further includes fourth instructions that generate a dependency script on the first partition that replicates dependencies made during the install of the application. The computer program product also includes fifth instructions that clone by the dependency script the dependencies to the first partition. The computer program product further includes sixth instructions that generate a fenced application in the first partition. The computer program product includes seventh instructions that modify an image in the IHS, to provide a first modified image, by unpacking the fenced application to provide the first modified image. The first, second, third, fourth, fifth, sixth and seventh instructions are store on the non-transitory computer readable storage medium.

BRIEF DESCRIPTION OF THE DRAWINGS

The appended drawings illustrate only exemplary embodiments of the invention and therefore do not limit its scope because the inventive concepts lend themselves to other equally effective embodiments.

DETAILED DESCRIPTION

Figure 1A:
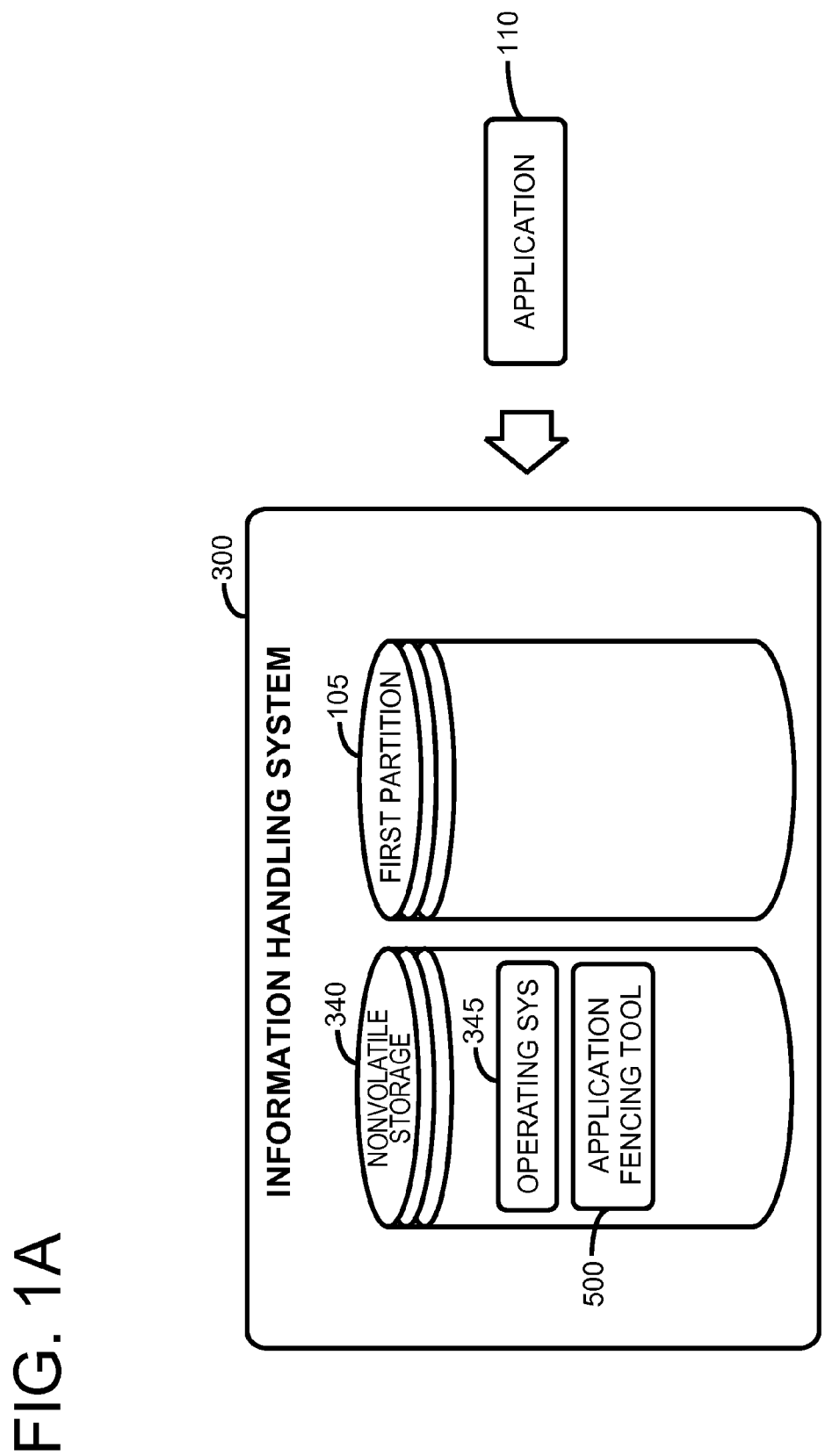
FIGS. 1A-1D are block diagrams showing multiple process states of one embodiment of the disclosed application fencing tool.

The disclosed dynamic image composition system employing fenced applications includes an information handling system (IHS) that may employ an application fencing tool to generate a fenced application. In one embodiment, a fenced application is an isolated, installed application with dependencies that may be easily unpackaged by a fenced imaging tool to an image and/or information handling system that utilizes the same operating system as the fenced application. The fenced imaging tool is discussed in detail below. In one embodiment, the application fencing tool may create a first partition on the nonvolatile storage of the IHS. The application fencing tool may then install an application to the first partition. Dependencies may be generated during installation of the application to the first partition of the IHS. Dependencies, i.e. dependent files, are files and/or folders on the IHS, that are generated and/or modified by the installer of the application during installation of the application on the IHS, but that are not stored on the first partition during application installation.

The application fencing tool may generate a dependency script that clones all dependencies to the first partition. After the dependencies are cloned in this manner, the application fencing tool may generate a fenced application from the installed application on the first partition of the IHS, from the dependency script on the first partition of the IHS, and further from the dependent files stored on the first partition of the IHS. In one embodiment, the fenced application may be a single file.

The disclosed dynamic image composition system employing fenced applications may also include an IHS that employs a fenced imaging tool to dynamically modify images with fenced applications, statically modify images with fenced applications and/or generate images with fenced applications. In one embodiment, the fenced imaging tool may create a new image and install an operating system on the new image. In another embodiment, the fenced imaging tool may modify an existing image. When instructed by a user, the fenced imaging tool may add a fenced application to an image dynamically, when the image is in use on an IHS, or statically, when the image is not in use on an IHS.

As described in more detail below, the fenced imaging tool may unpack a fenced application to a particular image. The particular image and the fenced application may require compatible operating systems. For example, a particular image with a Linux operating system may require the application fencing tool to generate fenced applications compatible with a Linux operating system (Linux is a trademark owned by Linus Torvalds). In one embodiment, the fenced imaging tool may utilize the dependency script of the fenced application to add dependencies from the fenced application to the particular image. The fenced imaging tool may unpack multiple fenced applications to the particular image. In another embodiment, the fenced imaging tool may remove a fenced application from the particular image. As described in more detail below, the fenced imaging tool may package a particular unpacked fenced application currently on the particular image. The fenced imaging tool may remove the particular unpacked fenced application from the particular image. The fenced imaging tool may then utilize the dependency script of the particular fenced application to remove dependencies from the image.

In another embodiment, the disclosed dynamic image composition system employing fenced applications may also be utilized in a network environment. As described in more detail below, the various tools of the dynamic image composition system with fenced application may be utilized on a plurality of IHSs connected by a network. For example, the application fencing tool may be used on a first IHS and the fenced imaging tool may be used on a second IHS. Fenced applications may be stored on a third IHS. Generated images with fenced applications may be stored on a fourth IHS. A fifth IHS may utilize a plurality of images with fenced applications that can be modified dynamically by the user of the fenced imaging tool on the second IHS. A sixth IHS may utilize a plurality of virtual machines simultaneously where each virtual machine utilizes an image with a plurality of fenced applications.

FIG. 1A is a block diagram of one of the process states of the application fencing tool of the disclosed dynamic image composition system employing fenced applications. In one embodiment, the dynamic image composition system employing fenced applications includes an information handling system (IHS) 300. IHS 300 includes nonvolatile storage 340. Nonvolatile storage 340 stores an operating system 345 that governs operations of IHS 300. Nonvolatile storage 340 also stores application fencing tool 500.

A user of IHS 300 may initialize application fencing tool 500. In one embodiment, application fencing tool 500 may generate a first partition 105 on nonvolatile storage 340. In another embodiment, the application fencing tool 500 may generate the first partition 105 on other local or non-local nonvolatile storage, e.g. a shared network drive, a USB memory stick or a shared hard drive on a networked IHS.

In one embodiment, the disclosed application fencing tool 500 may generate a graphical user interface (GUI) wherein the user of IHS 300 may select application 110 to install to the first partition 105. In another embodiment, the disclosed application fencing tool 500 may generate a command line interface wherein the user of IHS 300 may select application 110 to install to the first partition 105. In yet another embodiment, the user may utilize OS 345 to install the application to the first partition 105.

Figure 1B:
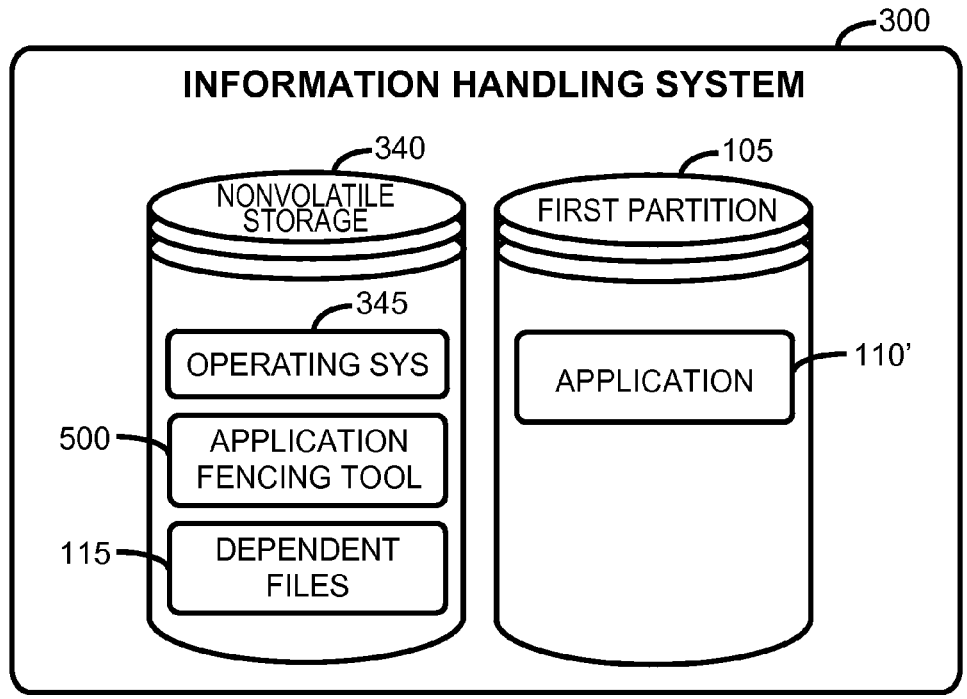

FIG. 1B is a block diagram of one of the process states of the application fencing tool of the disclosed dynamic image composition system employing fenced applications. Like numbers indicate like elements when comparing FIG. 1B to FIG. 1A. In one embodiment, the disclosed application fencing tool 500 may generate a graphical user interface (GUI) wherein the user of IHS 300 may select application 110 to install to the first partition 105, thus generating an installed application 110' on the first partition 105. In another embodiment, the disclosed application fencing tool 500 may generate a command line interface wherein the user of IHS 300 may select application 110 to install to the first partition 105, thereby generating an installed application 110' on the first partition 105. In yet another embodiment, the user may utilize OS 345 to install the application to the first partition 105, thus generating an installed application 110' on the first partition 105.

The application fencing tool 500 may monitor all changes made to IHS 300 during installation of the application 110. All changes the installer of the application 110 makes to IHS 300 during the installation of the application 110 to the first partition 105 that the installer of application 110 does not store on first partition 105 are referred to as dependencies, i.e. dependent files 115. Dependent files 115 may include, but are not limited to any changes the installer of the application 110 makes to IHS 300, e.g. files or folders created or modified by the installer of the application 110 on nonvolatile storage 340, but not created or modified by the installer of the application 110 on the first partition 105.

Figure 1C:
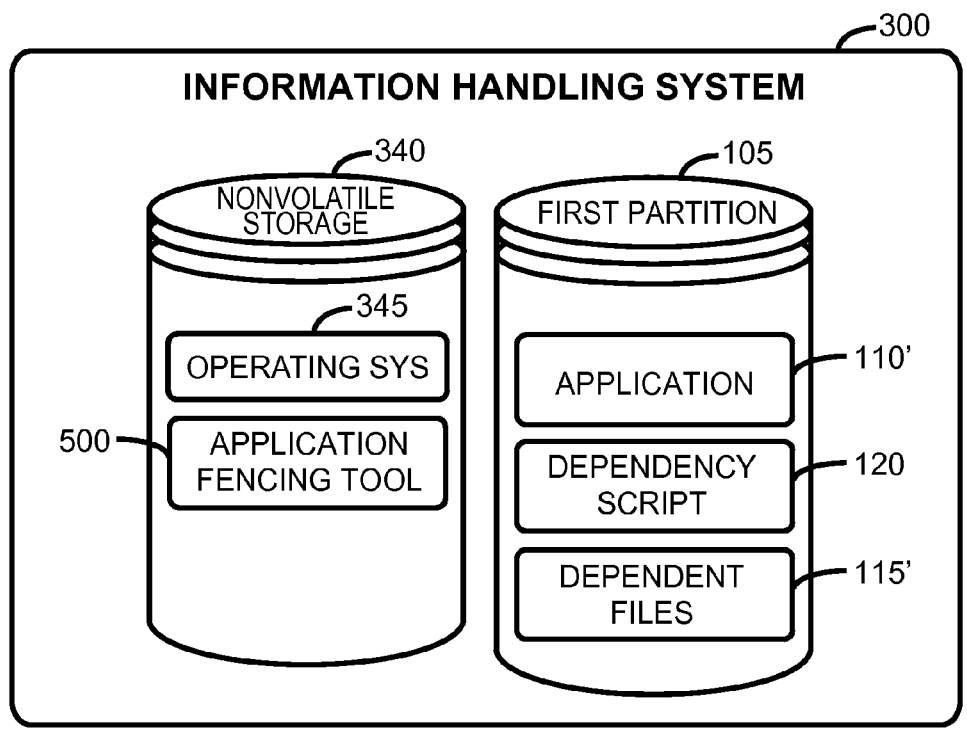

FIG. 1C is a block diagram of one of the process states of the application fencing tool of the disclosed dynamic image composition system employing fenced applications. Like numbers indicate like elements when comparing FIG. 1C to FIG. 1B. In one embodiment, if the application fencing tool 500 detects dependent files 115 during installation of the application 110 to IHS 300 by the installer of the application 110, then the application fencing tool 500 generates a dependency script 120 on the first partition 105. The dependency script 120 includes instructions that copy the dependent files 115 on nonvolatile storage 340 and thereby clone the dependent files 115 as dependent files 115' on the first partition 105. The dependency script 120 may include instructions to retain file hierarchy of dependent files 115.

The dependency script 120 may also include instructions to replicate specific changes made to specific system files included in dependent files 115 without copying the specific system files, e.g. the Windows registry of the Windows operating system (Windows is a trademark of Microsoft Corp.). In one embodiment, the application fencing tool 500 may delete dependent files 115 on nonvolatile storage 340 after the dependency script 120 clones the dependent files 115 as dependent files 115' on the first partition 105. In another embodiment, the dependency script 120 may also include instructions that copy the dependent files 115' on the first partition 105 and thereby clone the dependent files 115' as dependent files 115 on nonvolatile storage 340.

Figure 1D:
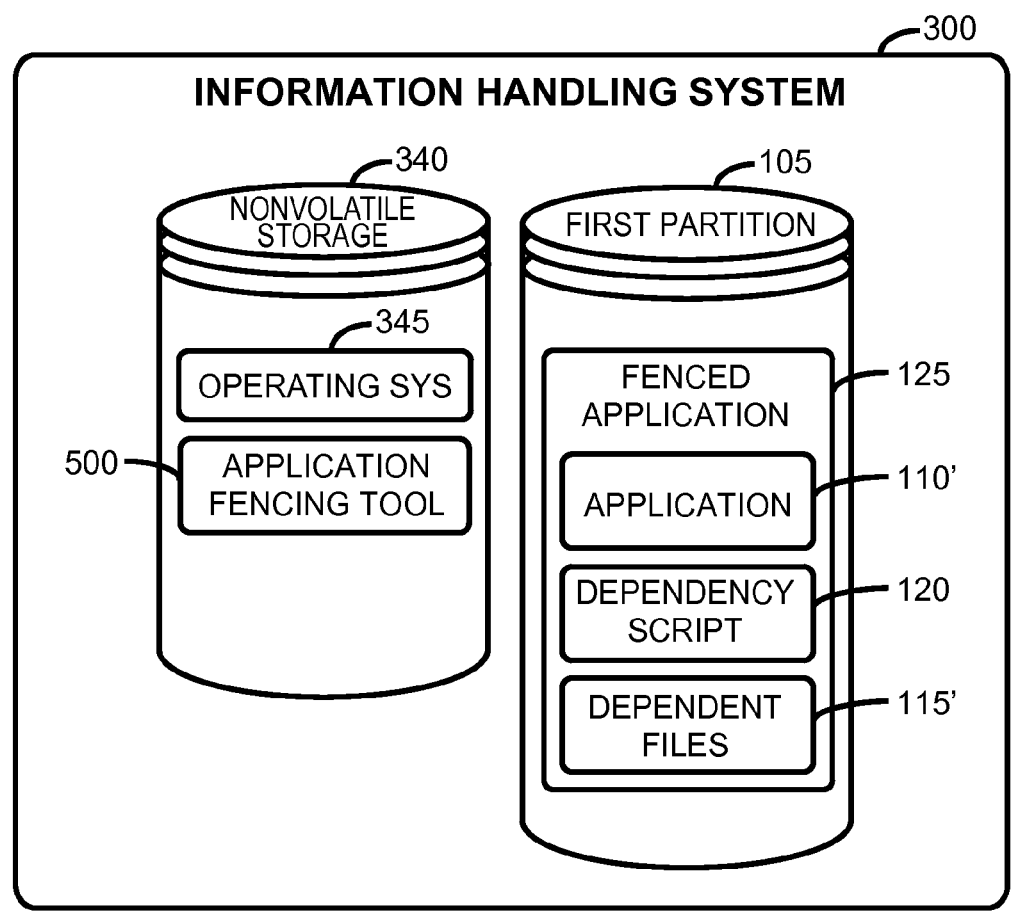

FIG. 1D is a block diagram of one of the process states of the application fencing tool of the disclosed dynamic image composition system employing fenced applications. Like numbers indicate like elements when comparing FIG. 1D to FIG. 1C. After the application fencing tool 500 checks and finds dependencies, generates a dependency script 120, and the dependency script 120 clones the dependent files 115' on the first partition 105, the application fencing tool 500 may generate a fenced application 125. The application fencing tool 500 may generate the fenced application 125 that may include the installed application 110', dependency script 120 and dependent files 115'. In one embodiment, the application fencing tool 500 may generate the fenced application 125 packed as a single file.

In an alternative embodiment, if the application fencing tool 500 does not detect dependent files 115 during installation of the application 110 to IHS 300 by the installer of the application 110, the application fencing tool 500 may generate a fenced application 125. The fenced application 125 may include the installed application 110'. In another embodiment, the fenced application 125 may include the installed application 110' and a blank dependency script 120.

Figure 2A:
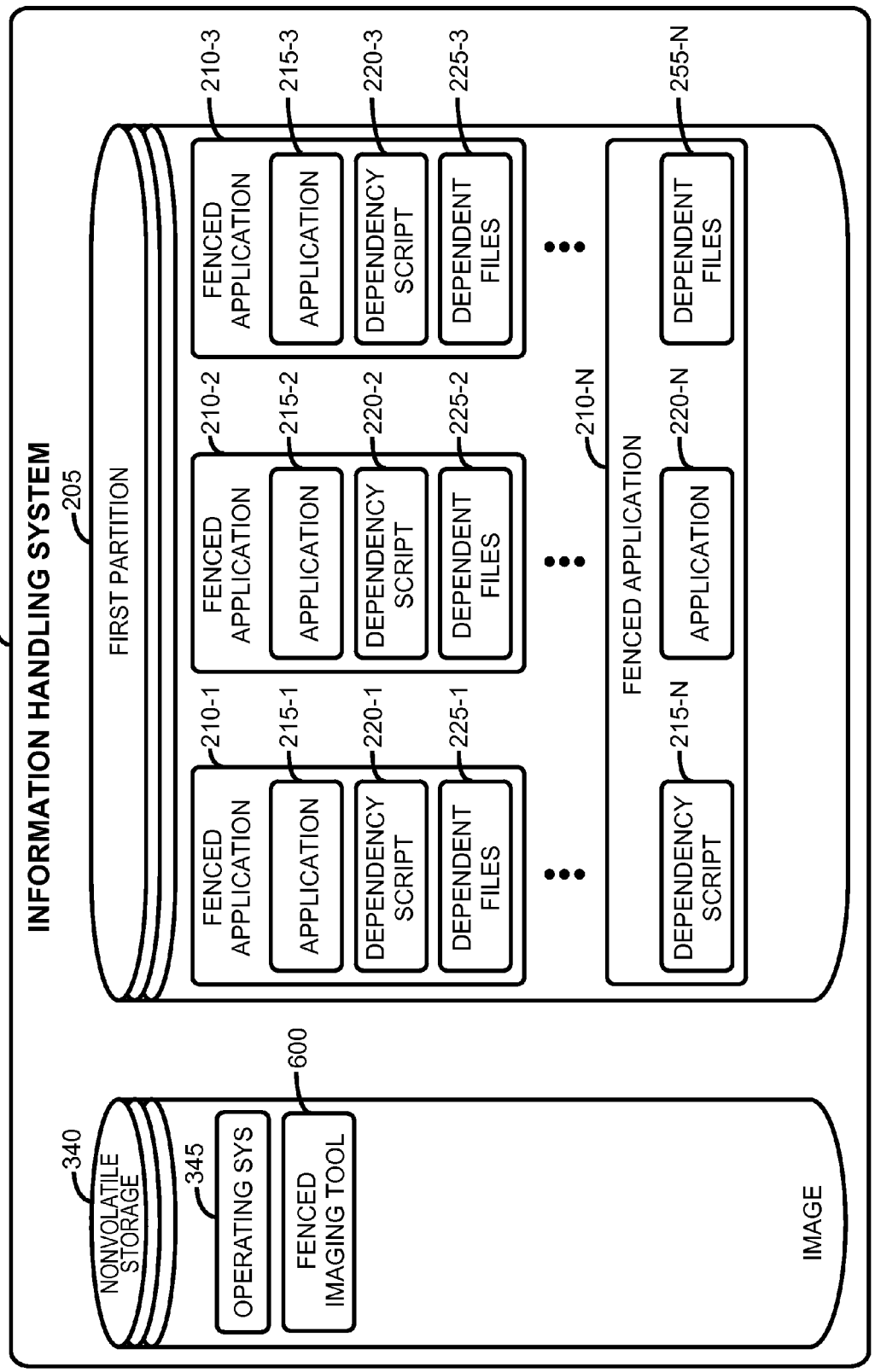
FIGS. 2A-2C are block diagrams showing multiple process states of one embodiment of the disclosed fenced imaging tool.

FIG. 2A is a block diagram of one of the process states of the fenced imaging tool of the disclosed dynamic image composition system employing fenced applications. In one embodiment, the dynamic image composition system employing fenced applications includes an information handling system (IHS) 300. IHS 300 includes nonvolatile storage 340. Nonvolatile storage 340 stores an operating system 345 that governs operations of IHS 300. Nonvolatile storage 340 also stores fenced imaging tool 600. In one embodiment, the nonvolatile storage 340 is an image that fenced imaging tool 600 may utilize. In another embodiment, an image may be in a virtual machine that fenced imaging tool 600 may utilize. In yet another embodiment, fenced imaging tool 600 does not reside on the image, as shown in FIGS. 2A-2D.

A user of IHS 300 may initialize fenced imaging tool 600. In one embodiment, the disclosed fenced imaging tool 600 may generate a graphical user interface (GUI) wherein the user of IHS 300 may select to either generate a new image on IHS 300 or to open an existing image on IHS 300, as discussed in more detail below with reference to block 610 of the flowchart FIG. 6. In another embodiment, the disclosed fenced imaging tool 600 may generate a command line interface wherein the user of IHS 300 may enter a command to either generate a new image on IHS 300 or to open an existing image on IHS 300.

In one embodiment, fenced imaging tool 600 may access a first partition 205 on nonvolatile storage 340. In another embodiment, the fenced imaging tool 600 may access the first partition 205 on other local or non-local nonvolatile storage, e.g. a shared network drive, a USB memory stick or a shared hard drive on a networked IHS.

The first partition 205 may include fenced application 210-1, fenced application 210-2, fenced application 210-3, . . . , fenced application 210-N, wherein N is the number of fenced applications that the first partition 205 stores. Fenced application 210-1 may include an installed application 215-1, dependency script 220-1 and dependent files 225-1. Fenced application 210-2 may include an installed application 215-2, dependency script 220-2 and dependent files 225-2. Fenced application 210-3 may include an installed application 215-3, dependency script 220-3 and dependent files 225-3. Likewise, fenced application 210-N may include an installed application 215-N, dependency script 220-N and dependent files 225-N.

Figure 2B:
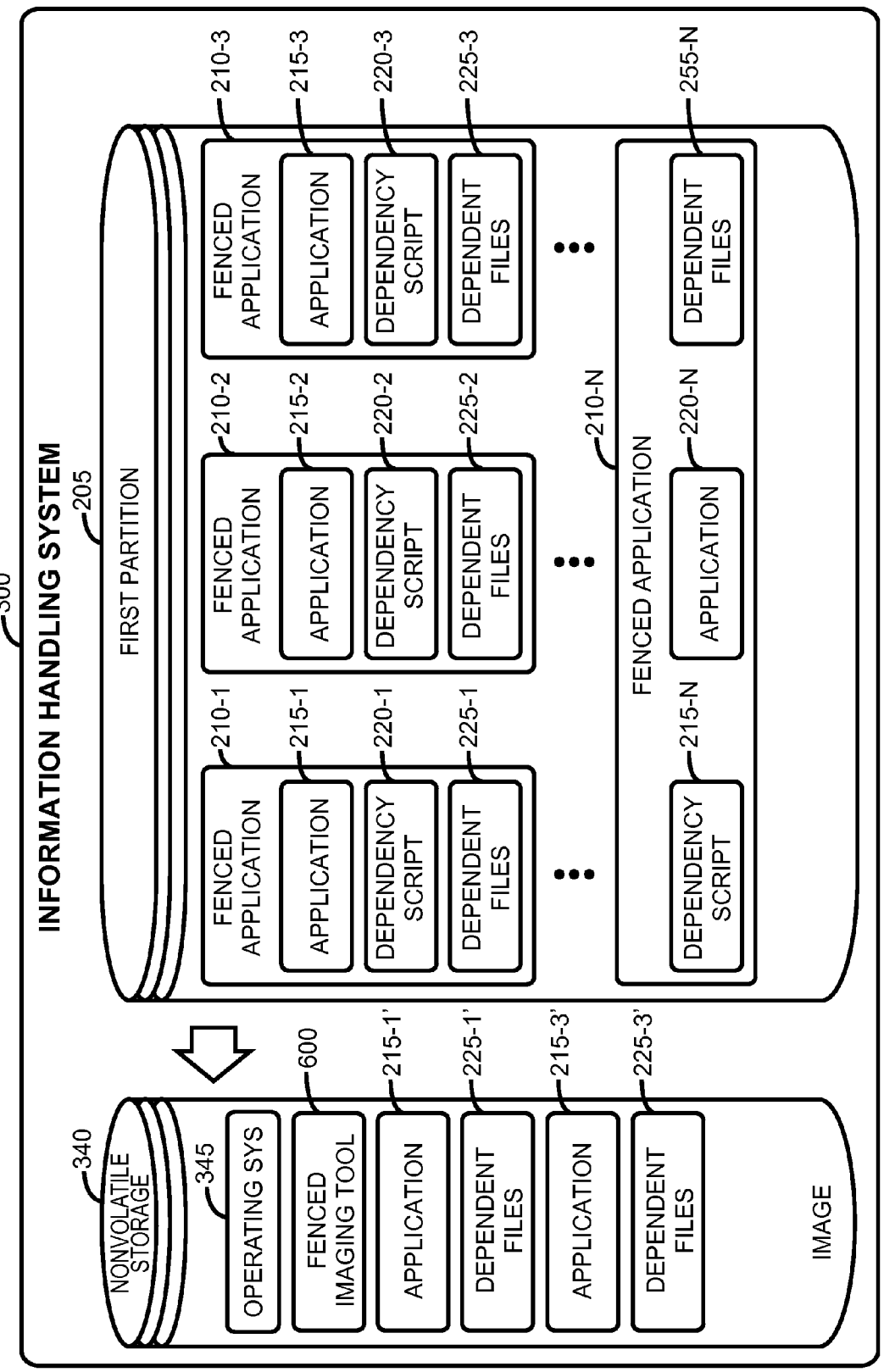

FIG. 2B is a block diagram of one of the process states of the fenced imaging tool of the disclosed dynamic image composition system employing fenced applications. Like numbers indicate like elements when comparing FIG. 2B to FIG. 2A. In one embodiment, the user of the fenced imaging tool 600 on IHS 300 may instruct fenced imaging tool 600 to unpack fenced application 210-1 and fenced application 210-3 on the image of IHS 300. When the fenced imaging tool 600 completely unpacks a fenced application to the image, the user may utilize the installed application. The fenced application is completely unpacked when both the fenced imaging tool 600 unpacks the installed application to the image and the dependency script clones the dependencies to the image.

In one embodiment, the fenced imaging tool 600 may unpack fenced application 210-1 by copying installed application 215-1 on the first partition 205 and cloning installed application 215-1 as installed application 215-1' on the nonvolatile storage 340. The fenced imaging tool 600 may then initialize the dependency script 220-1 that includes instructions to copy the dependent files 225-1 on the first partition 205 and thereby clone the dependent files 225-1 as dependent files 225-1' on nonvolatile storage 340. After the fenced imaging tool 600 unpacks fenced application 215-1 to the image and dependency script 220-1 clones dependent files 225-1' on the image, the user may utilize the installed application 215-1'.

In another embodiment, the fenced imaging tool 600 may unpack fenced application 210-3 by copying installed application 215-3 on the first partition 205 and cloning installed application 215-3 as installed application 215-3' on the nonvolatile storage 340. The fenced imaging tool 600 may then initialize the dependency script 220-3 that includes instructions to copy the dependent files 225-3 on the first partition 205 and thereby clone the dependent files 225-3 as dependent files 225-3' on nonvolatile storage 340. After the fenced imaging tool 600 unpacks fenced application 215-3 to the image and dependency script 220-3 clones dependent files 225-3' on the image, the user may utilize the installed application 215-3'.

Figure 2C:
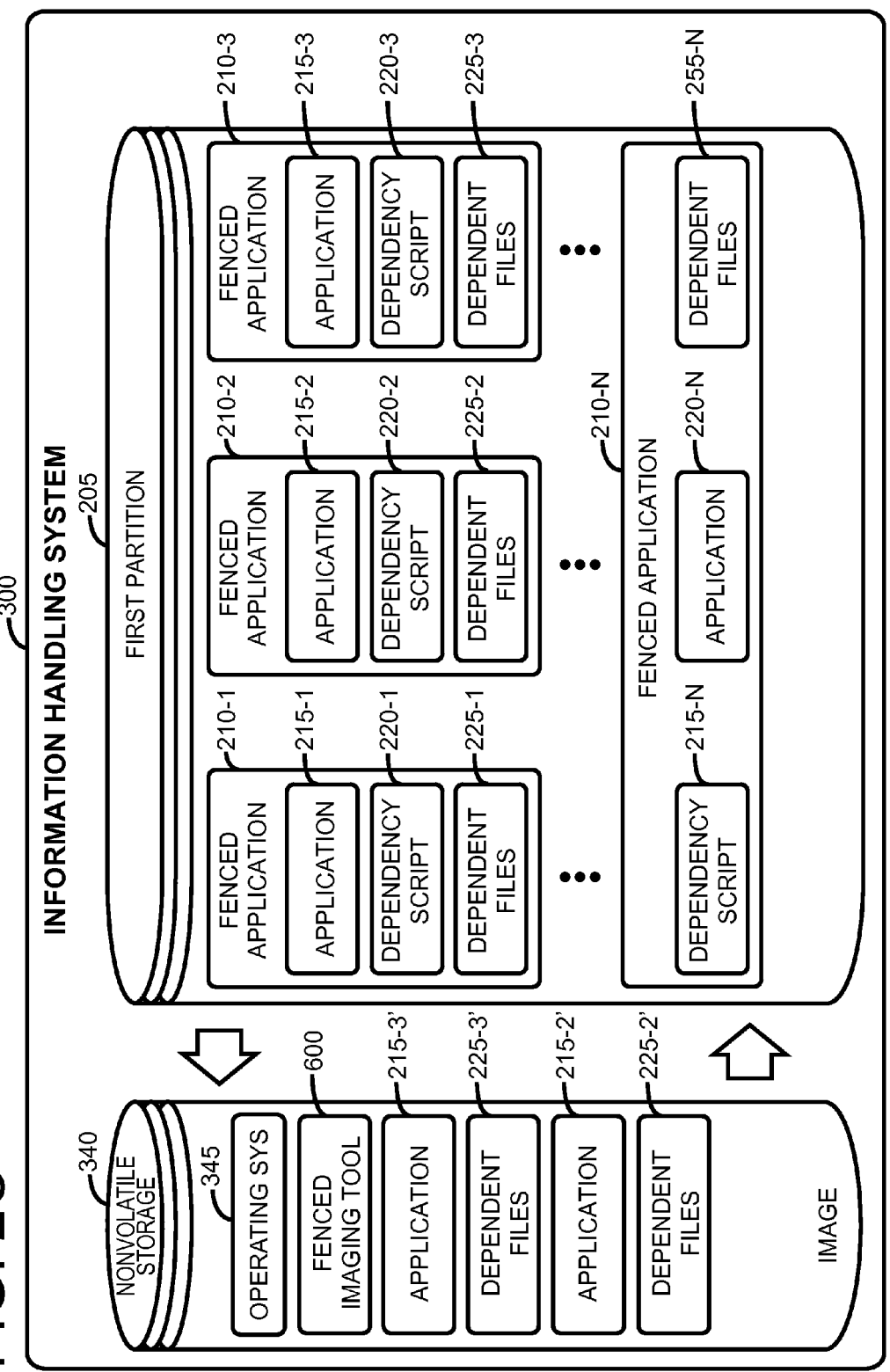

FIG. 2C is a block diagram of one of the process states of the fenced imaging tool of the disclosed dynamic image composition system employing fenced applications. Like numbers indicate like elements when comparing FIG. 2C to FIG. 2B. In one embodiment, the user of the fenced imaging tool 600 on IHS 300 may instruct fenced imaging tool 600 to package installed application 215-1', i.e. to package the unpacked fenced application 210-1 on the image of IHS 300 and then to unpack fenced application 210-2 on the image of IHS 300. When the fenced imaging tool 600 completely unpacks a fenced application to the image, the user may utilize the installed application. Conversely, when the fenced imaging tool 600 completely packages an unpackaged fenced application on the image, the user may no longer utilize the installed application.

In one embodiment, the fenced imaging tool 600 may package the unpacked fenced application 210-1, i.e. installed application 215-1' by deleting installed application 215-1' from the nonvolatile storage 340. The fenced imaging tool 600 may then initialize the dependency script 220-1 on the first partition 205 that includes instructions to remove the dependent files 225-1' on nonvolatile storage 340. The fenced imaging tool 600 completely packages the fenced application 215-1' and the dependent files 225-1' from the image, removing all traces of the unpacked fenced application 210-1 from the image. In another embodiment, installed application 215-1' may be packaged into a new fenced application stored on the first partition 205 and the dependency script 220-1 on the first partition 205 may include instructions to clone dependent files 225-1' on the first partition 205 with the installed application 215-1'. The fenced imaging tool 600 may then package the previously installed application 215-1' and the associated dependent files 225-1' as a new fenced application on the first partition 205 (not shown).

In another embodiment, the fenced imaging tool 600 may unpack fenced application 210-2 by copying installed application 215-2 on the first partition 205 and cloning installed application 215-2 as installed application 215-2' on the nonvolatile storage 340. The fenced imaging tool 600 may then initialize the dependency script 220-2 that includes instructions to copy the dependent files 225-2 on the first partition 205 and thereby clone the dependent files 225-2 as dependent files 225-2' on nonvolatile storage 340. After the fenced imaging tool 600 unpacks fenced application 215-2 to the image and dependency script 220-2 clones dependent files 225-2' on the image, the user may utilize the installed application 215-2'.

Figure 3:
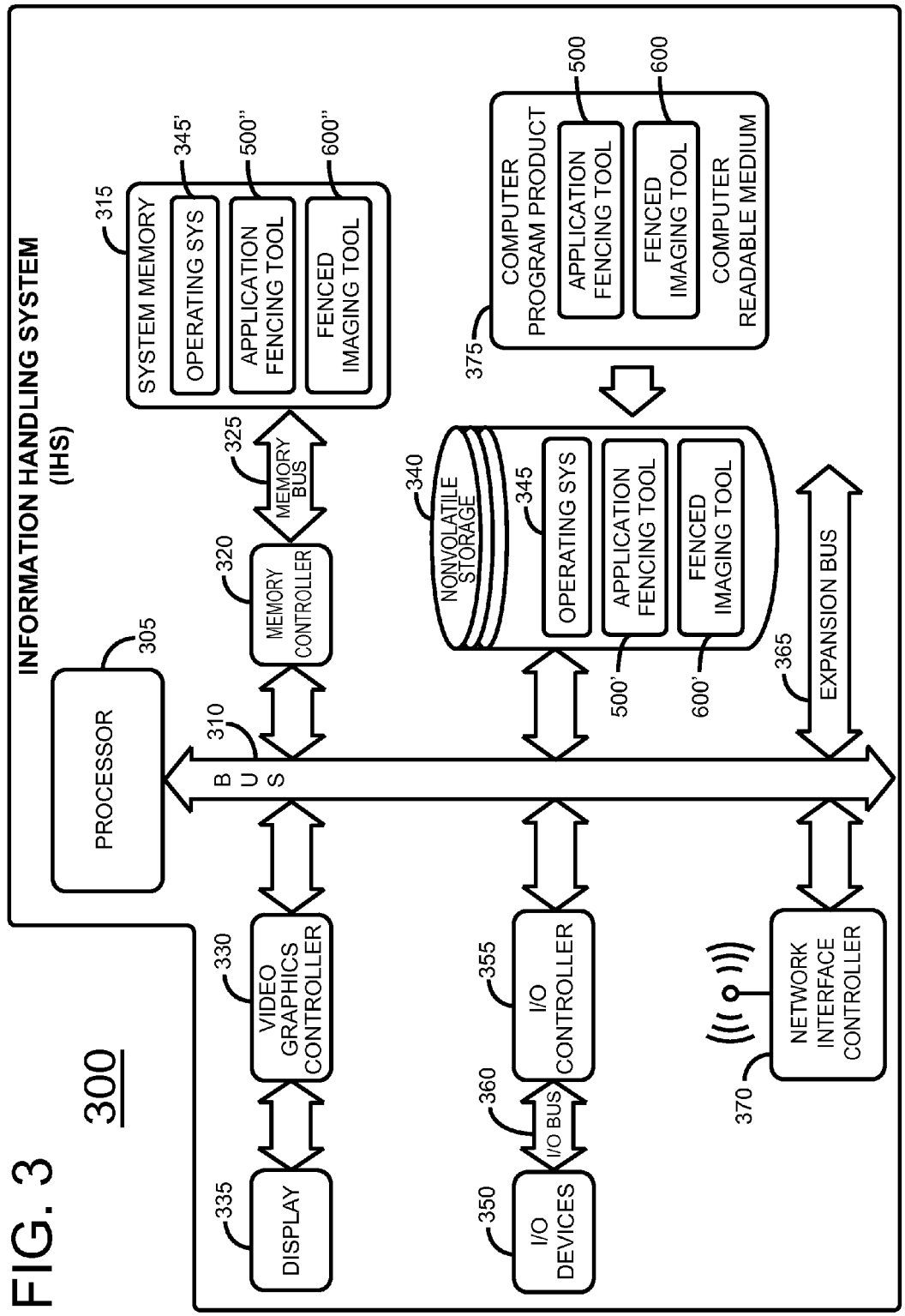
FIG. 3 is a block diagram of an information handling system (IHS) that may be used in the dynamic image composition system employing fenced applications.

FIG. 3 is a block diagram of an information handling system (IHS) 300 that, in one embodiment, employs the disclosed application fencing tool 500 to generate a fenced application. In another embodiment, IHS 300 may employ the disclosed fenced imaging tool to dynamically modify images with fenced applications, statically modify images with fenced applications and/or generate images with fenced applications. IHS 300 includes a processor 305 that may include multiple cores. IHS 300 processes, transfers, communicates, modifies, stores or otherwise handles information in digital form, analog form or other form. IHS 300 includes a bus 310 that couples processor 305 to memory 315 via a memory controller 320 and memory bus 325. System memory 315 may also be referred to as main memory. System memory 315 may be a static random access memory (SRAM) array or a dynamic random access memory (DRAM) array. Processor 305 may also include local memory such as L1, L2 and L3 caches. A video graphics controller 330 couples display 335 to bus 310. Nonvolatile storage 340, such as a hard disk drive, solid-state drive (SSD), CD drive, DVD drive, or other nonvolatile storage couples to bus 310 to provide IHS 300 with permanent storage of information. System memory 315 and nonvolatile storage 340 are both forms of memory stores. Nonvolatile storage 340 stores an operating system 345 (OPERATING SYS) that governs operation of IHS 300. I/O devices 350, such as speakers, a keyboard and a pointing device, couple to bus 310 via I/O controller 355 and I/O bus 360.

One or more expansion busses 365, such as USB, IEEE 1394 bus, ATA, SATA, PCI, PCIE, DVI, HDMI and other busses, couple to bus 310 to facilitate the connection of peripherals and devices to IHS 300. A network interface controller 370 couples to bus 310 to enable IHS 300 to connect by wire or wirelessly to a network and other information handling systems. Network interface controller 370 may also be called a network communication adapter or a network adapter. While FIG. 3 shows one IHS that employs processor 305, the IHS may take many forms. For example, IHS 300 may take the form of a desktop, portable, laptop, notebook, tablet or other form factor computer or data processing system. IHS 300 may take other form factors such as a gaming device, a personal digital assistant (PDA), a portable telephone device, a communication device or other devices that include a processor and memory.

In one embodiment, IHS 300 includes an application fencing tool computer program product 500 and fenced imaging tool computer program product 600 on digital media 375 such as a CD, DVD or other media. For simplicity, the term application fencing tool 500 and fenced imaging tool 600 will be used below, respectively. In one embodiment, IHS 300 may store application fencing tool 500 in nonvolatile storage 340 as application fencing tool 500'. In another embodiment, IHS 300 may store fenced imaging tool 600 in nonvolatile storage 340 as fenced imaging tool 600'. IHS 300 may also store operating system 345 (OPERATING SYS) in nonvolatile storage 340. When IHS 300 initializes, the server IHS loads operating system 345 into system memory 315 for execution as operating system 345'. In one embodiment, IHS 300 also loads application fencing tool 500' into system memory 315 for execution as application fencing tool 500". In another embodiment, IHS 300 also loads fenced imaging tool 600' into system memory 315 for execution as fenced imaging tool 600".

Figure 4:
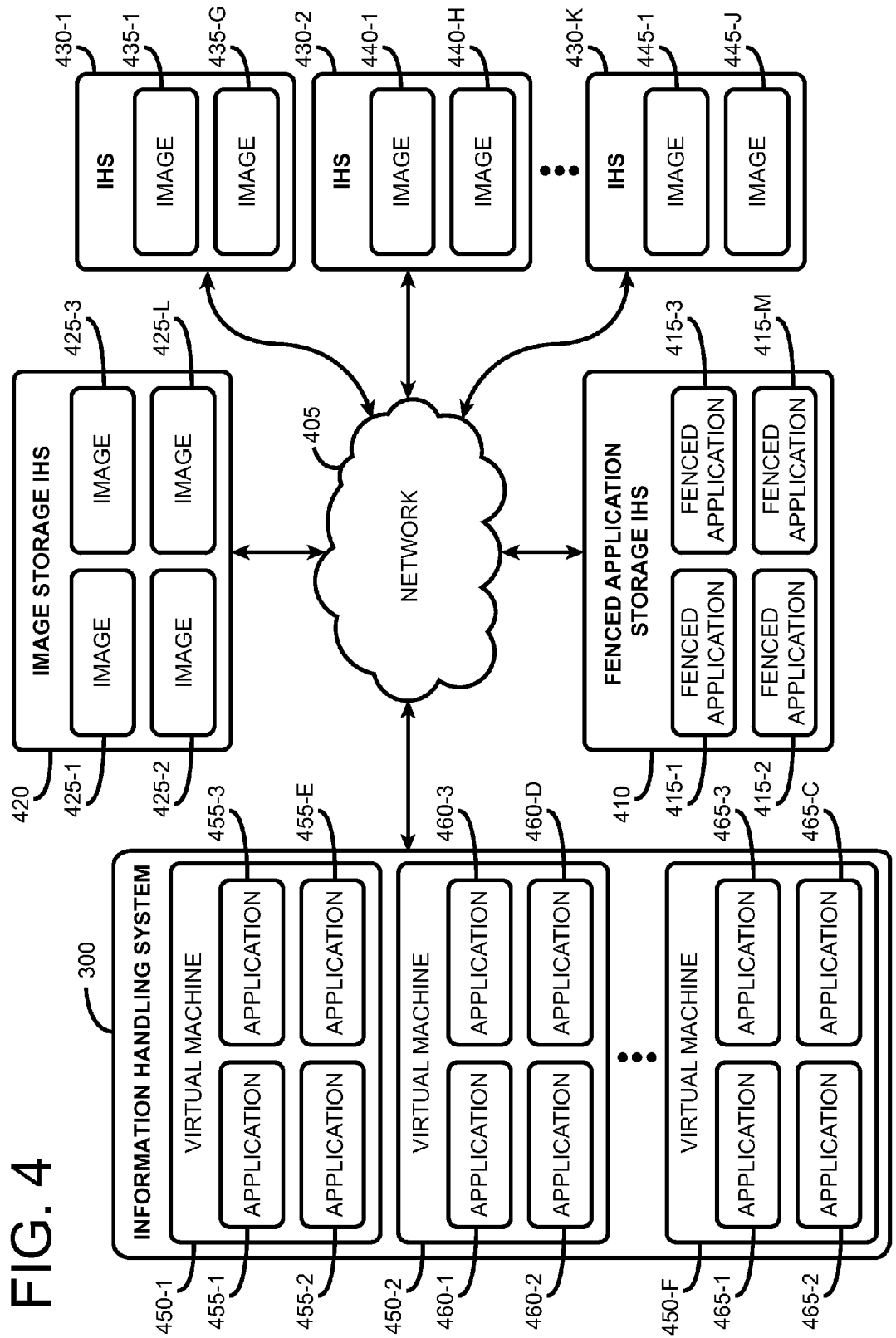
FIG. 4 is a block diagram of one embodiment of the disclosed dynamic image composition system employing fenced applications.

FIG. 4 is a block diagram of one embodiment of the disclosed dynamic image composition system employing fenced applications. In one embodiment, a network 405 connects a plurality of information handling systems (IHSs). Network 405 may be any type of network such as a local area network (LAN), wide area network (WAN) or series of interconnected networks, e.g., the internet.

Network 405 may couple to a fenced application storage IHS 410. The fenced application storage IHS 410 may include fenced application 415-1, fenced application 415-2, fenced application 415-3, . . . , fenced application 415-M, wherein M is the number of fenced applications stored in the fenced application storage IHS 410. In one embodiment, the fenced application storage IHS 410 may serve as a repository for fenced applications. In another embodiment, multiple IHSs with respective application fencing tools 500 may store fenced applications on the fenced application storage IHS 410.

Network 405 may couple to an image storage IHS 420. The image storage IHS 420 may include image 425-1, image 425-2, image 425-3, . . . , image 425-L, wherein L is the number of images stored in the image storage IHS 420. In one embodiment, the image storage IHS 420 may serve as a repository for images. In another embodiment, multiple IHSs with respective fenced image tools 600 may store images on the image storage IHS 420.

Network 405 may couple to IHS 430-1, IHS 430-2, . . . , IHS 430-K, wherein K is the number of information handling systems connected to network 405. IHS 430-1 may include image 435-1, . . . , 435-J, wherein J is the number of images included on IHS 430-1. IHS 430-2 may include image 440-1, . . . , 440-H, wherein H is the number of images included on IHS 430-2. IHS 430-G may include image 445-1, . . . , 445-G, wherein G is the number of images included on IHS 430-K. For example, IHS 430-1 may include a plurality of images. Each user that utilizes IHS 430-1 may have a custom image with custom fenced applications therein. In one embodiment, each user of IHS 430-1 may utilize several images.

Network 405 may couple to IHS 300. IHS 300 may include a plurality of virtual machines running concurrently. IHS 300 may include virtual machine 450-1, virtual machine 450-2, . . . , virtual machine 450-F, wherein F is the number of virtual machines active on IHS 300. Virtual machine 450-1 may include an image with installed application 455-1, installed application 455-2, installed application 455-3, . . . , installed application 455-E, wherein E is the number of installed applications and respective dependent files on the image on virtual machine 450-1. Virtual machine 450-2 may include an image with installed application 460-1, installed application 460-2, installed application 460-3, . . . , installed application 460-D, wherein D is the number of installed applications and respective dependent files on the image on virtual machine 450-2. Virtual machine 450-F may include an image with installed application 465-1, installed application 465-2, installed application 465-3, . . . , installed application 465-C, wherein C is the number of installed applications and respective dependent files on the image on virtual machine 450-F.

Figure 5:
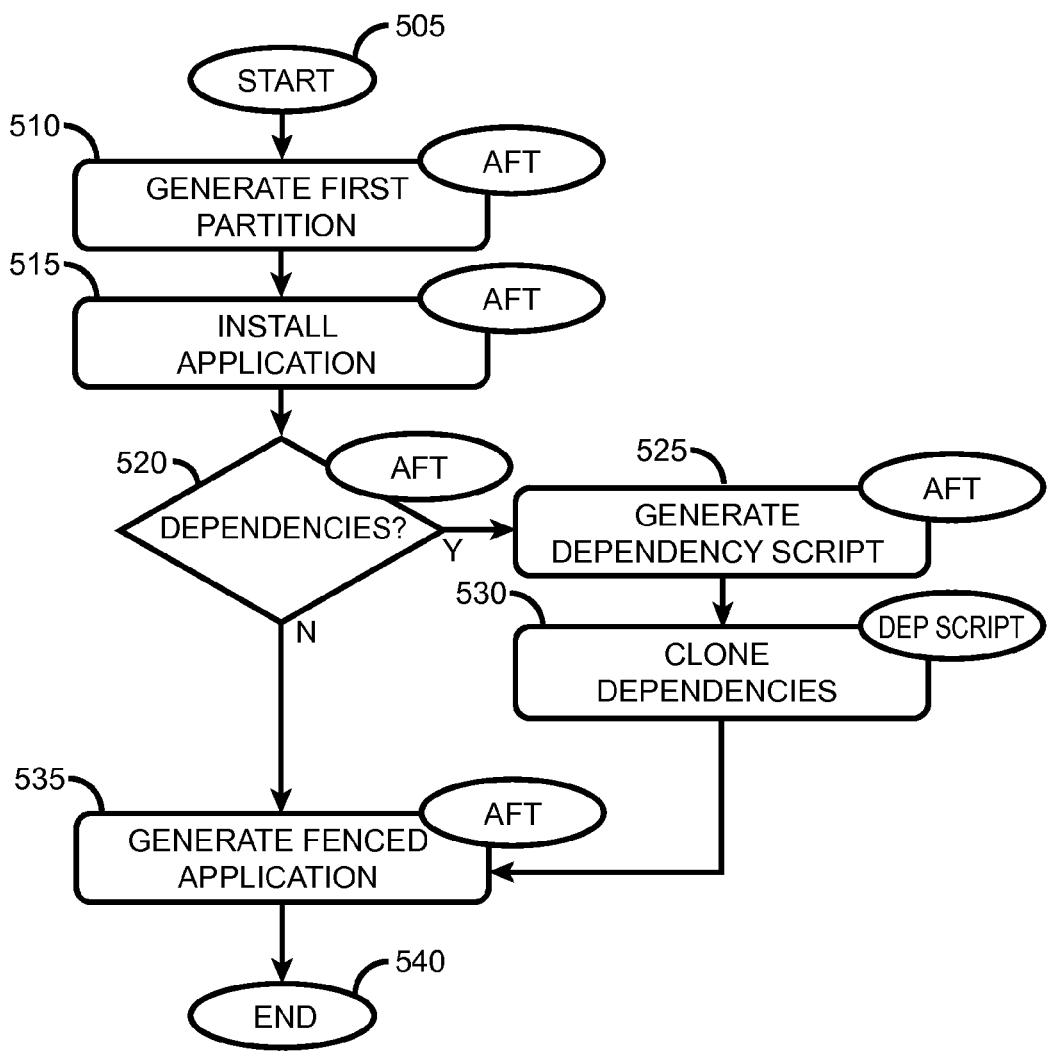
FIG. 5 is a flowchart that shows process flow in one embodiment of the disclosed application fencing tool.

FIG. 5 is a flowchart that shows a representative process flow of the disclosed application fencing tool (AFT) 500. Process flow commences when the user executes and/or initializes application fencing tool 500, as per block 505. Application fencing tool 500 may generate a first partition 105 on nonvolatile storage 340 or other nonvolatile storage, as per block 510. Other nonvolatile storage may be local to the information handling system 300 or may not be local to IHS 300.

In one embodiment, the disclosed application fencing tool 500 may generate a graphical user interface (GUI) wherein the user of IHS 300 may select application 110 to install to the first partition 105, thus generating an installed application 110' on the first partition 105, as per block 515. In another embodiment, the disclosed application fencing tool 500 may generate a command line interface wherein the user of IHS 300 may select application 110 to install to the first partition 105, thus generating an installed application 110' on the first partition 105. In yet another embodiment, the user may utilize OS 345 to install the application to the first partition 105, thereby generating an installed application 110' on the first partition 105.

In one embodiment, the application fencing tool 500 may monitor all changes made to IHS 300 during installation of the application 110. All changes the installer of the application 110 makes to IHS 300 during the installation of the application 110 to the first partition 105 that the installer of application 100 does not store on first partition 105 are referred to as dependencies, i.e. dependent files 115. Dependent files 115 may include, but are not limited to any changes the installer of the application 110 makes to IHS 300, e.g. files or folders created or modified by the installer of the application 110 on nonvolatile storage 340, but not created or modified by the installer of the application 110 on the first partition 105.

If the application fencing tool 500 detects dependent files 115 during installation of the application to IHS 300 by the installer of the application 110, as per decision block 520, then the application fencing tool 500 generates a dependency script 120, as per block 525. The dependency script 120 includes instructions that copy the dependent files 115 on nonvolatile storage 340 and thereby clone the dependent files 115 as dependent files 115' on the first partition 105, as per block 530. The dependency script 120 may include instructions to retain file hierarchy of dependent files 115. The dependency script 120 may also include instructions to replicate specific changes made to specific system files included in dependent files 115 without copying the specific system files, e.g. the Windows registry of the Windows operating system (Windows is a trademark of Microsoft Corp.). In another embodiment, the dependency script 120 may also include instructions that copy the dependent files 115' on the first partition 105 and thus clone the dependent files 115' as dependent files 115 on nonvolatile storage 340.

After the application fencing tool 500 checks and finds dependencies as per block 520, generates a dependency script as per block 525, and the dependency script 120 clones the dependent files 115 as per block 530, process flow resumes at block 535. The application fencing tool 500 may generate a fenced application 125 that may include the installed application 110', dependency script 120 and dependent files 115', as per block 535. In one embodiment, the application fencing tool 500 may generate the fenced application 125 as a single file.

In another embodiment, if the application fencing tool 500 detects dependent files 115 during installation of the application to IHS 300 by the installer of the application 110, as per block 520, the application fencing tool 500 may prompt the user to manually enter a dependency script 120. The user may generate a dependency script 120 manually, as per block 525. The dependency script 120 may then clone the dependencies as described above, as per block 530. The application fencing tool 500 may generate a fenced application 125 that may include the installed application 110', dependency script 120 and dependent files 115', as described above, as per block 535.

If the application fencing tool 500 does not detect dependent files 115 during installation of the application to IHS 300 by the installer of the application 110, as per block 520, the application fencing tool 500 may generate a fenced application 125 that may include the installed application 110'. Process flow terminates at the end of block 540, or alternatively returns to block 505 for the generation of another fenced application.

Figure 6:
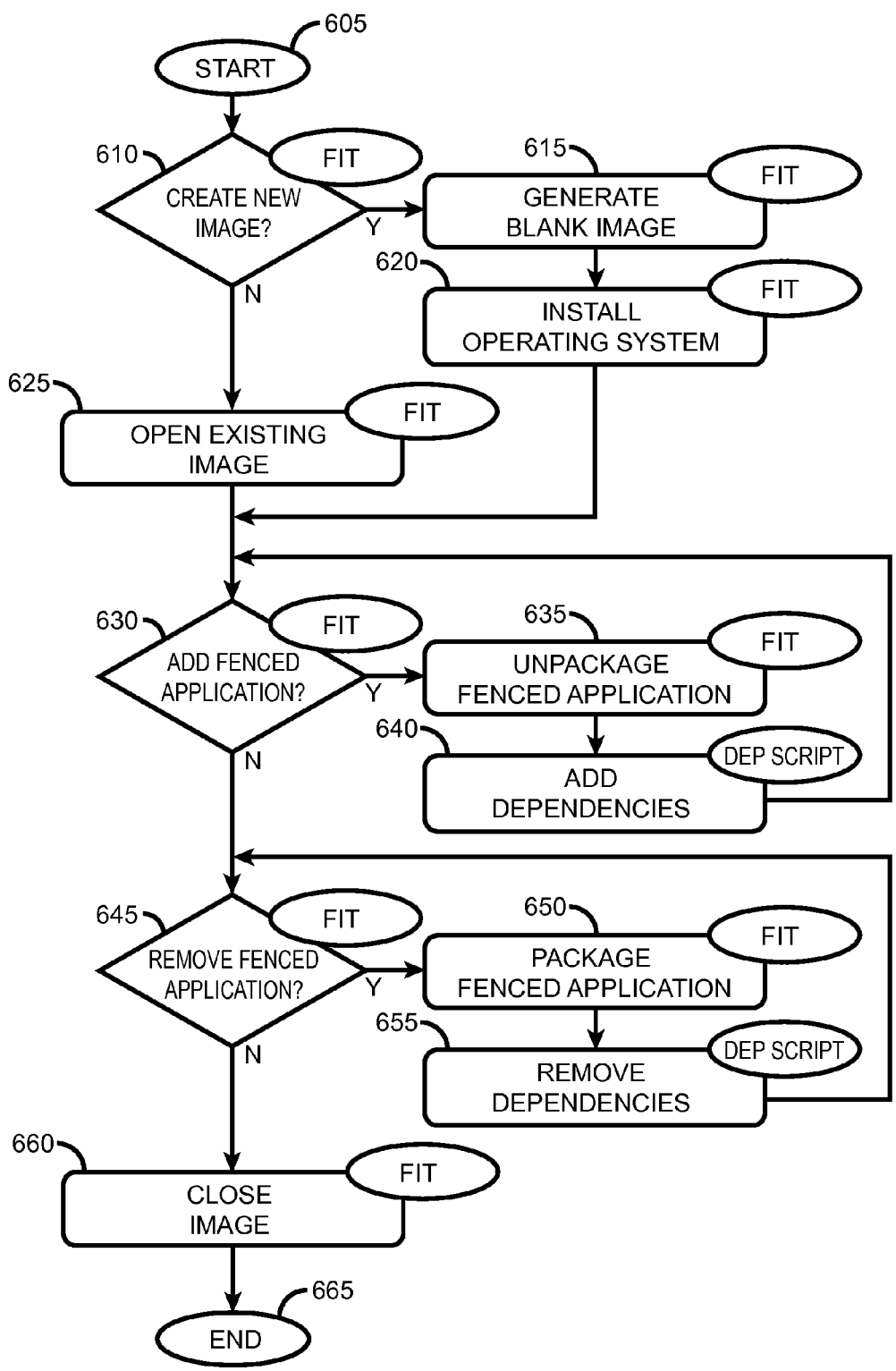
FIG. 6 is a flowchart that shows process flow in one embodiment of the disclosed fenced imaging tool.

FIG. 6 is a flowchart that shows a representative process flow of the disclosed fenced imaging tool (FIT) 600. Process flow commences when the user executes and/or initializes fenced imaging tool 600, as per block 605. In one embodiment, the disclosed fenced imaging tool 600 may generate a graphical user interface (GUI) wherein the user of IHS 300 may select to either generate a new image on IHS 300 or to open an existing image on IHS 300, as per block 610. In another embodiment, the disclosed fenced imaging tool 600 may generate a command line interface wherein the user of IHS 300 may enter a command to either generate a new image on IHS 300 or to open an existing image on IHS 300.

If the user of the fenced imaging tool 600 chooses to create a new image, as per block 610, the fenced imaging tool 600 may generate a blank image, as per block 615. The user of fenced imaging tool 600 may then prompted to select the desired operating system for installation on the blank image. The user may select an operating system that the fenced imaging tool 600 may install on the blank image. The fenced imaging tool 600 may install the operating system on the blank image, as per block 620.

If the user of the fenced imaging tool 600 chooses to open an existing image, as per block 610, the fenced imaging tool 600 may open an existing image, as per block 625.

Process flow continues with the fenced imaging tool 600 prompting the user to add a fenced application to the image, as per block 630. In one embodiment, fenced imaging tool 600 may access a first partition 205 on nonvolatile storage 340. In another embodiment, the fenced imaging tool 600 may access the first partition 205 on other local or non-local nonvolatile storage, e.g. a shared network drive, a USB memory stick or a shared hard drive on a networked IHS. The first partition 205 may include fenced application 210-1, fenced application 210-2, fenced application 210-3, . . . , fenced application 210-N, wherein N is the number of fenced applications stored on the first partition 205. Fenced application 210-1 may include an installed application 215-1, dependency script 220-1 and dependent files 225-1.

If the user selects to add a fenced application 225-1 to the image, as per block 630, the fenced imaging tool 600 unpacks fenced application 225-1, as per block 635. In one embodiment, the fenced imaging tool 600 may unpack fenced application 210-1 by copying installed application 215-1 on the first partition 205 and cloning installed application 215-1 as installed application 215-1' on the nonvolatile storage 340.

The fenced imaging tool 600 may then initialize the dependency script 220-1 that includes instructions to copy the dependent files 225-1 on the first partition 205 and thereby clone the dependent files 225-1 as dependent files 225-1' on nonvolatile storage 340, as per block 640. After the fenced imaging tool 600 unpacks fenced application 215-1 to the image and the dependency script 220-1 clones the dependent files 225-1' to the image, the user may utilize the installed application 215-1'. Process flow continues by the fenced imaging tool 600 prompting the user to add a fenced application to the image, as per block 630.

If the user declines to add a fenced application to the image, as per block 630, the fenced imaging tool 600 may prompt the user to remove a fenced application, as per block 645. If the user selects to remove a fenced application 225-1 from the image, as per block 645, the fenced imaging tool 600 may package the unpacked fenced application 210-1, i.e. installed application 215-1' by deleting installed application 215-1' from the nonvolatile storage 340, as per block 650. The fenced imaging tool 600 may then initialize the dependency script 220-1 on the first partition 205 that includes instructions to remove the dependent files 225-1' on nonvolatile storage 340, as per block 655.

The fenced imaging tool 600 may completely package the fenced application 215-1' and the dependent files 225-1' from the image, removing all traces of the unpacked fenced application 210-1 from the image. In another embodiment, installed application 215-1' may be packaged into a new fenced application stored on the first partition 205 and the dependency script 220-1 on the first partition 205 may include instructions to clone dependent files 225-1' on the first partition 205 with the installed application 215-1'. The fenced imaging tool 600 may then package the previously installed application 215-1' and the associated dependent files 225-1' as a new fenced application on the first partition 205 (not shown). When the fenced imaging tool 600 completely packages an unpackaged fenced application on the image, the user may no longer utilize the installed application. Process flow continues by the fenced imaging tool 600 prompting the user to remove a fenced application from the image, as per block 645.

If the user declines to remove a fenced application from the image, as per block 640, the fenced imaging tool 600 may close the image, as per block 660. Process flow terminates at the end of block 665.

As will be appreciated by one skilled in the art, aspects of the disclosed methodology may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the FIGS. 5-6 flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart of FIGS. 5-6 and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart of FIGS. 5-6 described above.

The flowchart of FIGS. 5-6 illustrates the architecture, functionality, and operation of possible implementations of systems, methods and computer program products that perform analysis in accordance with various embodiments of the present invention. In this regard, each block in the flowcharts of FIGS. 7 and 8 may represent a module, segment, or portion of code, which comprises one or more executable instructions for implementing the specified logical function(s). It should also be noted that, in some alternative implementations, the functions noted in the block may occur out of the order noted in FIGS. 5-6. For example, two blocks shown in succession may, in fact, be executed substantially concurrently, or the blocks may sometimes be executed in the reverse order, depending upon the functionality involved. It will also be noted that each block of FIGS. 5-6 and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An information handling system (IHS), comprising:
a processor;
a system memory coupled to the processor, the system memory including an application fencing tool, wherein the application fencing tool configures the IHS to:
install an operating system in the IHS;
generate a first partition in the IHS;
install an application to the first partition in the IHS to provide an installed application thus generating dependencies;
generate a dependency script on the first partition that replicates dependencies made during the install of the application;
clone by the dependency script the dependencies to the first partition;
generate a fenced application in the first partition;
wherein the system memory further includes a fenced imaging tool that configures the IHS to:
modify an image in the IHS, to provide a first modified image, by unpacking the fenced application to provide the first modified image; and
modify the first modified image to provide a second modified image, wherein the modifying of the first modified image includes removing the fenced application from the first modified image to provide the second modified image, wherein the removing of the fenced application from the first modified image includes packaging the fenced application to provide the second modified image, wherein the removing of the fenced application from the first modified image further includes removing dependencies, by the dependency script, from the first modified image to provide the second modified image.

2. The IHS of claim 1, wherein the application fencing tool packages the fenced application into a single file.

3. The IHS of claim 1, wherein modifying the image in the IHS to provide a first modified image includes adding dependencies, by the dependency script, to the image to provide the first modified image.

4. A computer program product, comprising:
a non-transitory computer readable storage medium;
first instructions that install an operating system in an IHS;
second instructions that generate a first partition in the IHS;
third instructions that install an application to the first partition in the IHS to provide an installed application thus generating dependencies;
fourth instructions that generate a dependency script on the first partition that replicates dependencies made during the install of the application;
fifth instructions that clone by the dependency script the dependencies to the first partition;
sixth instructions that generate a fenced application in the first partition;
seventh instructions that modify an image in the IHS, to provide a first modified image, by unpacking the fenced application to provide the first modified image; and
eighth instructions that modify the first modified image to provide a second modified image, wherein the modifying of the first modified image includes removing the fenced application from the first modified image to provide the second modified image, wherein the removing of the fenced application from the first modified image includes packaging the fenced application to provide the second modified image, wherein the removing of the fenced application from the first modified image further includes removing dependencies, by the dependency script, from the first modified image to provide the second modified image;
wherein the first, second, third, fourth, fifth, sixth, seventh and eighth instructions are stored on the non-transitory computer readable storage medium.

5. The computer program product of claim 4, further comprising ninth instructions that package the fenced application into a single file.

6. The computer program product of claim 4, wherein the seventh instructions include the dependency script, wherein the dependency script adds dependencies to the image to provide the first modified image.

* * * * *